US010246077B2

(12) United States Patent
Mouri et al.

(10) Patent No.: US 10,246,077 B2
(45) Date of Patent: Apr. 2, 2019

(54) VEHICLE REGENERATIVE SPEED CONTROL DEVICE

(71) Applicant: Nissan Motor Co., Ltd., Yokohama-shi, Kanagawa (JP)

(72) Inventors: Takanobu Mouri, Kanagawa (JP); Takahiro Yoshino, Kanagawa (JP); Yuuzou Kageyama, Kanagawa (JP); Masashi Ono, Kanagawa (JP); Hideki Maruyama, Kanagawa (JP); Takuya Ishizuka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/559,097

(22) PCT Filed: Mar. 20, 2015

(86) PCT No.: PCT/JP2015/058407
§ 371 (c)(1),
(2) Date: Sep. 18, 2017

(87) PCT Pub. No.: WO2016/151663
PCT Pub. Date: Sep. 29, 2016

(65) Prior Publication Data
US 2018/0244258 A1 Aug. 30, 2018

(51) Int. Cl.
*B60W 20/14* (2016.01)
*B60W 20/30* (2016.01)
(Continued)

(52) U.S. Cl.
CPC ............. *B60W 20/14* (2016.01); *B60K 6/543* (2013.01); *B60W 10/06* (2013.01); *B60W 10/08* (2013.01);
(Continued)

(58) Field of Classification Search
CPC ...... B60W 20/14; B60W 20/13; B60W 10/18; B60W 20/15; B60W 10/08; B60W 20/40;
(Continued)

(56) References Cited

U.S. PATENT DOCUMENTS 5,839,533 A * 11/1998 Mikami ................. B60K 6/365
180/165
8,744,712 B2 * 6/2014 Tashiro ..................... B60L 7/18
303/152
(Continued)

FOREIGN PATENT DOCUMENTS

CN 1521046 A 8/2004
CN 102348587 A 2/2012
(Continued)

*Primary Examiner* — Courtney D Heinle
*Assistant Examiner* — Luis A Martinez Borrero
(74) *Attorney, Agent, or Firm* — Global IP Counselors, LLP

(57) ABSTRACT

A vehicle regenerative speed control device is provided that includes a controller which performs a regenerative speed control for downshifting a belt-type continuously variable transmission to the low gear ratio side and increasing a rotational speed of a transmission input shaft to which a motor generator is connected when there is a request for an increase in the regeneration amount while decelerating. The controller also imposes the limitation of staying within a Pri end command rotational speed change rate for the Pri end command rotational speed when performing a regenerative speed control for increasing the Pri end command rotational speed based on a braking operation in a brake switching region for switching from regenerative braking to hydraulic braking due to a decrease in vehicle speed.

4 Claims, 6 Drawing Sheets

(51) Int. Cl.
*B60W 30/18* (2012.01)
*B60W 10/08* (2006.01)
*B60W 10/26* (2006.01)
*B60W 10/30* (2006.01)
*B60K 6/543* (2007.10)
*B60W 10/06* (2006.01)
*B60W 10/107* (2012.01)
*B60W 10/184* (2012.01)
*F16H 61/04* (2006.01)
*B60W 10/196* (2012.01)
*B60W 30/20* (2006.01)
*B60K 6/48* (2007.10)

(52) U.S. Cl.
CPC ........ *B60W 10/107* (2013.01); *B60W 10/184* (2013.01); *B60W 10/196* (2013.01); *B60W 10/26* (2013.01); *B60W 10/30* (2013.01); *B60W 20/30* (2013.01); *B60W 30/18127* (2013.01); *B60W 30/20* (2013.01); *F16H 61/04* (2013.01); B60K 2006/4825 (2013.01); B60W 2520/10 (2013.01); B60W 2540/12 (2013.01); B60W 2710/082 (2013.01); B60W 2710/1005 (2013.01); B60W 2710/1011 (2013.01); B60W 2710/1016 (2013.01); B60W 2710/1038 (2013.01); B60W 2720/106 (2013.01); B60Y 2300/19 (2013.01); B60Y 2300/89 (2013.01); Y02T 10/6252 (2013.01); Y02T 10/6286 (2013.01); Y10S 903/918 (2013.01); Y10S 903/947 (2013.01)

(58) Field of Classification Search
CPC ........ B60W 20/10; B60W 20/00; B60K 6/48; B60K 7/0007; B60K 6/46; B60K 6/547; B60K 1/02
See application file for complete search history.

(56) References Cited

U.S. PATENT DOCUMENTS

| | | | | |
|---|---|---|---|---|
| 8,798,838 | B2* | 8/2014 | Yamanaka | B60K 6/48 701/22 |
| 9,989,150 | B2* | 6/2018 | Yamanaka | B60K 6/48 |
| 2006/0064225 | A1* | 3/2006 | Tabata | B60K 6/48 701/96 |
| 2012/0022735 | A1* | 1/2012 | Tashiro | B60L 7/18 701/22 |
| 2016/0031433 | A1* | 2/2016 | Park | B60W 10/11 701/22 |
| 2016/0137066 | A1* | 5/2016 | Nada | B60L 1/003 701/22 |
| 2016/0159225 | A1* | 6/2016 | Nakatsu | B60L 7/26 701/71 |
| 2016/0290502 | A1* | 10/2016 | Yamanaka | B60K 6/48 |
| 2018/0079418 | A1* | 3/2018 | Iwasa | B60K 6/40 |
| 2018/0080553 | A1* | 3/2018 | Iwasa | B60L 7/14 |
| 2018/0106367 | A1* | 4/2018 | Mouri | B60K 6/442 |

FOREIGN PATENT DOCUMENTS

| | | |
|---|---|---|
| CN | 102556068 A | 7/2012 |
| CN | 103322183 A | 9/2013 |
| JP | 2001-112117 A | 4/2001 |
| JP | 2003-2086 A | 1/2003 |
| JP | 2004-196064 A | 7/2004 |
| JP | 2007-50866 A | 3/2007 |
| WO | 2014/148124 A1 | 9/2014 |
| WO | 2015/037042 A1 | 3/2015 |

* cited by examiner

VEHICLE REGENERATIVE SPEED CONTROL DEVICE

CROSS-REFERENCE TO RELATED APPLICATIONS

This application is a U.S. National stage application of International Application No. PCT/JP2015/058407, filed Mar. 20, 2015.

BACKGROUND

Field of the Invention

The present invention relates to a vehicle regenerative speed control device that increases the rotational speed of a transmission input shaft to which an electric motor is connected by downshifting a continuously variable transmission when there is a request for an increase in the regeneration amount during deceleration.

Background Information

Conventionally, a hybrid vehicle control device is known which executes downshifting to increase the transmission ratio of the transmission when executing regenerative control in order to improve the regenerative efficiency (for example, refer to Patent Document 1—Japanese Laid Open Patent Application No. 2007-50866).

SUMMARY

However, in a conventional device, for example, when a regenerative speed control is carried out based on an additional brake pedal depression operation in a brake switching region brought about by a decrease in the vehicle speed at the time of cooperative regenerative control, an inertia shock occurs due to a sudden change in the actual transmission input rotational speed. That is, in a regenerative speed control carried out in order to improve the regenerative efficiency, downshifting is carried out in which the transmission input rotational speed command value is rapidly raised toward the target rotational speed of the regenerative braking, and once the target rotational speed is reached, upshifting is carried out in which the transmission input rotational speed command value is rapidly lowered in accordance with the target rotational speed. In addition, if the regenerative speed control is set to a feedback transmission control, the follow-up response of the actual transmission input rotational speed with respect to the transmission input rotational speed command value is delayed. Consequently, the actual transmission input rotational speed is rapidly increased, then turned back and rapidly decreased, causing an overshoot in which the actual transmission input rotational speed exceeds the target rotational speed. With this rapid change in the actual transmission input rotational speed, inertia shock occurs in the vicinity of the turnaround of the rise/fall of the transmission input rotational speed, so that there is the problem that discomfort is imparted to a driver that is maintaining a constant brake operation after additional brake pedal depression.

In view of the problems described above, an object of the present invention is to provide a vehicle regenerative speed control device that prevents discomfort from being imparted to a driver who maintains a constant request operation after requesting an increase, when performing a regenerative speed control based on a request for an increase in the regeneration amount in a brake switching region due to a decrease in vehicle speed while decelerating.

In order to achieve the object described above, the present invention comprises a continuously variable transmission and an electric motor that is connected to an input shaft side of the continuously variable transmission and that regenerates energy during deceleration. This vehicle is provided with a controller which, when there is a request for an increase in the regeneration amount while decelerating, performs a regenerative speed control for downshifting the continuously variable transmission to the low gear ratio side, and increasing the rotational speed of a transmission input shaft to which the electric motor is connected. The controller imposes a limitation on a rotational speed change rate of the transmission input rotational speed when performing a regenerative speed control for increasing the transmission input rotational speed based on a request for an increase in the regeneration amount in a brake switching region, in which regenerative braking is switched to mechanical braking, due to a decrease in the vehicle speed.

Therefore, the controller imposes a limitation on a rotational speed change rate of the transmission input rotational speed when performing a regenerative speed control for increasing the transmission input rotational speed based on a request for an increase in the regeneration amount in a brake switching region, in which regenerative braking is switched to mechanical braking, due to a decrease in the vehicle speed. That is, in a regenerative speed control based on a request for an increase in the regeneration amount, downshifting is carried out, in which the transmission input rotational speed is increased toward the target rotational speed. However, since the transmission input rotational speed reaches the target rotational speed of regenerative braking, which has a characteristic of decreasing with time in a brake switching region, it is necessary to lower the transmission input rotational speed after reaching the target rotational speed. By imposing a limitation on the rotational speed change rate when performing a regenerative speed control based on a request for an increase in the regeneration amount in such a brake switching region, the rotational speed change rate of the transmission input rotational speed changes gradually. Thus, even if there is a follow-up response delay due to a feedback transmission control, it is possible to suppress overshooting, in which the actual transmission input rotational speed exceeds the target rotational speed, and the occurrence of inertia shock in the vicinity of where the transmission input rotational speed shifts from increase to decrease is also suppressed. As a result, it is possible to prevent discomfort from being imparted to a driver who maintains a constant request operation after requesting an increase, when performing a regenerative speed control based on a request for an increase in the regeneration amount in a brake switching region due to a decrease in vehicle speed while decelerating.

BRIEF DESCRIPTION OF THE DRAWINGS

Referring now to the drawings, a regenerative speed control device for hybrid vehicles is illustrated.

DETAILED DESCRIPTION OF THE EMBODIMENTS

Figure 1:
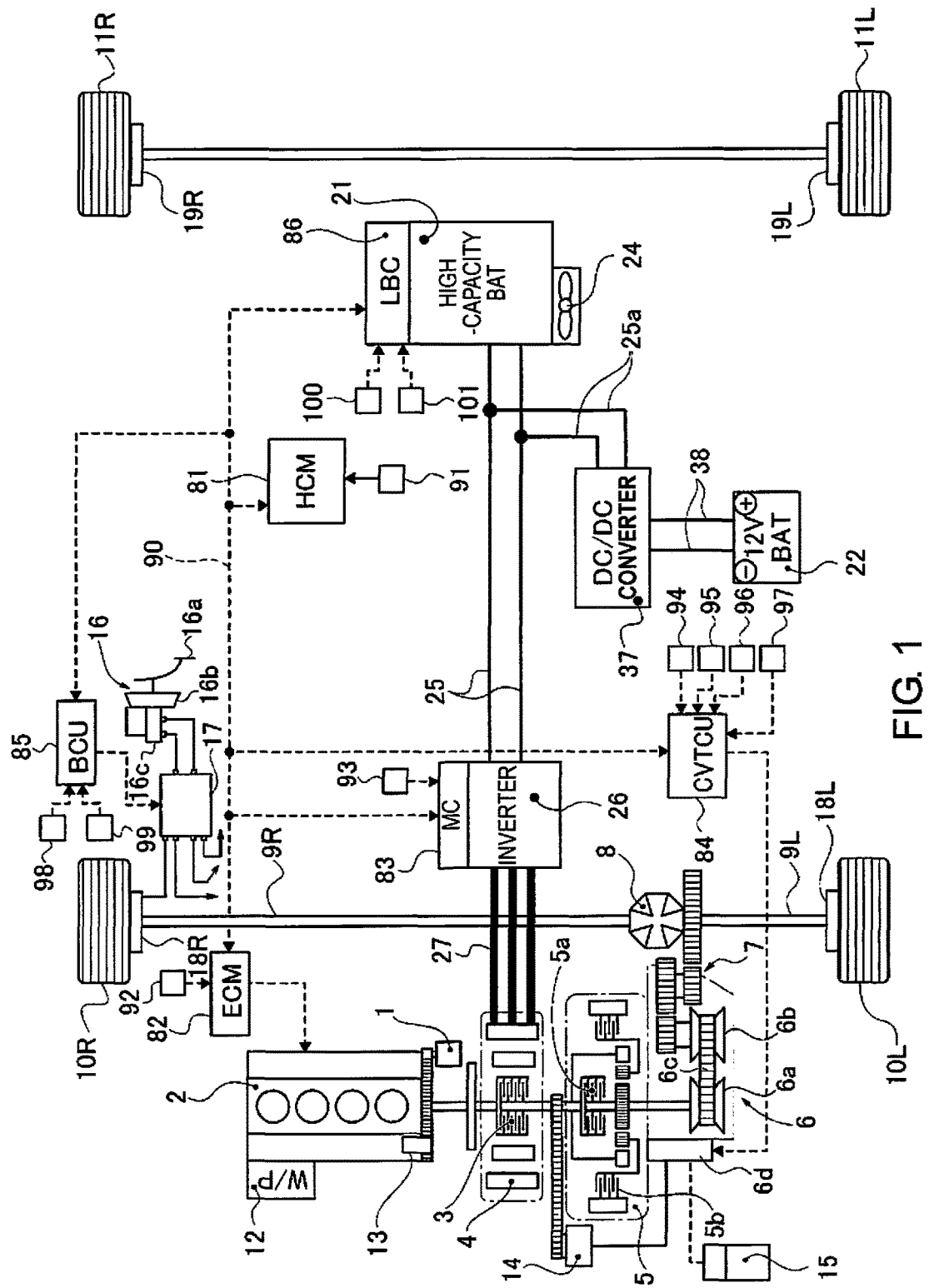
FIG. 1 is an overall system view illustrating an FF hybrid vehicle to which is applied the regenerative speed control device of the first embodiment.

A preferred embodiment for realizing a vehicle regenerative speed control device of the present invention is described below based on the first embodiment illustrated in the drawings.

First Embodiment

The configuration is described first. A regenerative speed control device according to the first embodiment is applied to an FF hybrid vehicle (one example of a vehicle) having left and right front wheels as the drive wheels and equipped with a belt-type continuously variable transmission as the continuously variable transmission. The "overall system configuration" and the "configuration of the regenerative speed control process" will be separately described regarding the configuration of the regenerative speed control device for FF hybrid vehicles in the first embodiment.

Overall System Configuration

FIG. 1 illustrates an overall system view of an FF hybrid vehicle to which is applied the regenerative speed control device of the first embodiment. The overall system configuration of the FF hybrid vehicle will be described below based on FIG. 1.

A drive system of an FF hybrid vehicle is provided with a transverse engine 2, a first clutch 3 (abbreviated as "CL1"), a motor-generator 4 (abbreviated as "MG"), a second clutch 5 (abbreviated as "CL2"), and a belt-type continuously variable transmission 6 (abbreviated as "CVT"), as illustrated in FIG. 1. An output shaft of the belt-type continuously variable transmission 6 is drivingly coupled to left and right front wheels 10R, 10L, via a final reduction gear train 7, a differential gear 8, and left and right drive shafts 9R, 9L. The left and right rear wheels 11R, 11L are configured as driven wheels.

The transverse engine 2 is an engine disposed at the front with a starter motor 1 and the crankshaft direction in the vehicle width direction, comprising an electric water pump 12, and a crankshaft rotation sensor 13 that detects a reverse rotation of the transverse engine 2. The transverse engine 2 comprises, as engine starting methods, an "MG start mode" that carries out cranking by the motor-generator 4 while slip-engaging the first clutch 3, and a "starter startup mode" that carries out cranking by a starter motor 1 that has a 12V battery 22 as the power source. The "starter startup mode" is selected only when limited conditions are met, such as extremely low temperature conditions.

The motor-generator 4 is a three-phase alternating current permanent magnet synchronous motor which is coupled to the transverse engine 2 via the first clutch 3. The motor-generator 4 uses a high-capacity battery 21, described below, as the power source, and an inverter 26, which converts direct current to three-phase alternating current during powering and converts three-phase alternating current to direct current during regeneration, is connected to the stator coil via an AC harness 27. The first clutch 3, which is interposed between the transverse engine 2 and the motor-generator 4, is a hydraulically actuated dry or wet multi-plate clutch, in which complete engagement/slip engagement/disengagement are controlled by the first clutch hydraulic pressure.

The second clutch 5 is a hydraulically actuated dry multi-plate friction clutch interposed between the motor-generator 4 and the left and right front wheels 10R, 10L, which are the drive wheels, in which complete engagement/slip engagement/disengagement are controlled by the second clutch hydraulic pressure. The second clutch 5 in the first embodiment is configured by diverting a forward clutch 5a and a reverse brake 5b provided in a forward/reverse switching mechanism configured by planetary gears. That is, the forward clutch 5a is used as the second clutch 5 during forward traveling, and the reverse brake 5b is used as the second clutch 5 during reverse traveling.

The belt-type continuously variable transmission 6 comprises a primary pulley 6a, a secondary pulley 6b, and a belt 6c that is wound around the two pulleys 6a, 6b. Furthermore, this continuously variable transmission is a transmission that achieves a stepless transmission ratio by changing the winding diameter of the belt 6c, by a primary pressure and a secondary pressure that are supplied to a primary oil chamber and a secondary oil chamber. The belt-type continuously variable transmission 6 comprises, as hydraulic power sources, a main oil pump 14 (mechanical drive) rotationally driven by a motor shaft of the motor-generator 4 (=transmission input shaft), and a sub oil pump 15 (motor drive) that is used as an auxiliary pump. The continuously variable transmission comprises a control valve unit 6d, which uses a line pressure PL, generated by adjusting the pump discharge pressure from the hydraulic power source, as the source pressure to produce a first clutch pressure, a second clutch pressure, as well as the primary pressure and the secondary pressure of the belt-type continuously variable transmission 6. The oil pump that is the target of the lower-limit rotational speed of the first embodiment is the main oil pump 14, which is rotationally driven by the motor-generator 4 (electric motor), which is mounted as a traveling drive source.

The first clutch 3, the motor-generator 4, and the second clutch 5 configure a so-called one-motor two-clutch hybrid drive system, having, as main driving modes, an "EV mode," an "HEV mode," and a "WSC mode." The "EV mode" is an electric vehicle mode in which the first clutch 3 is released and the second clutch 5 is engaged, and in which the motor-generator 4 is the only drive source; traveling by this "EV mode" is referred to as "EV traveling." The "HEV mode" is a hybrid vehicle mode in which both clutches 3 and 5 are engaged, and in which the transverse engine 2 and the motor-generator 4 are the drive sources; traveling by this "HEV mode" is referred to as "HEV traveling." The "WSC mode" is a CL2 slip engagement mode in which the motor rotational speed of the motor-generator 4 is controlled in the "HEV mode" or the "EV mode," and the second clutch 5 is slip-engaged with an engagement torque capacity corresponding to a required driving force. When the vehicle is stopped, by setting the "WSC mode" in which the second clutch 5 is slip-engaged, it is possible to rotate the motor-generator 4.

The brake system of the FF hybrid vehicle comprises a brake operating unit 16, a brake fluid pressure control unit 17, left and right front wheel brake units 18R and 18L, and left and right rear wheel brake units 19R and 19L. In this brake system, as the motor-generator 4 carries out regeneration at the time of a brake operation, a cooperative regenerative control is carried out with respect to the requested braking force based on a pedal operation, whereby the portion obtained by subtracting the regenerative braking from the requested braking force is allotted to the hydraulic braking. That is, in a cooperative regenerative control, the requested braking force is given as the sum of regenerative braking and hydraulic braking, such that when regenerative braking is decreased, hydraulic braking is increased.

The brake operating unit 16 comprises a brake pedal 16a, a negative pressure booster 16b, which uses the intake negative pressure of the transverse engine 2, a master cylinder 16c, and the like. The regenerative cooperation brake unit 16 generates a predetermined master cylinder pressure according to a brake pedal stepping force from a driver that is applied to the brake pedal 16a, and is a simply configured unit that does not use an electric booster.

The brake fluid pressure control unit 17 comprises, although not shown, an electric oil pump, a pressure increasing solenoid valve, a pressure decreasing solenoid valve, an oil passage switching valve, and the like. By the control of the brake fluid pressure control unit 17 by a brake control unit 85, a function to generate a wheel cylinder hydraulic pressure when the brake is not operated, and a function to adjust the wheel cylinder hydraulic pressure when the brake is operated, are exerted. Examples of the controls that use the hydraulic pressure generation function when the brake is not operated include traction control (TCS control), vehicle behavior control (VDC control), emergency brake control (automatic brake control), and the like. Examples of controls that use the hydraulic pressure adjustment function at the time of a brake operation include cooperative regenerative control, anti-lock brake control (ABS control), and the like.

The left and right front wheel brake units 18R and 18L are respectively provided on the left and right front wheels 10R and 10L, and the left and right rear wheel brake units 19R and 19L are respectively provided to the left and right rear wheels 11R and 11L, and apply hydraulic braking force to each of the wheels. The brake units 18R, 18L, 19R and 19L are provided with wheel cylinders, which are not shown, to which the brake fluid pressure produced by the brake fluid pressure control unit 17 is supplied.

The power supply system of the FF hybrid vehicle is provided with a high-capacity battery 21 as the motor-generator 4 power source, and a 12V battery 22 as a 12V system load power source, as illustrated in FIG. 1.

The high-capacity battery 21 is a secondary battery that is mounted as a power source of the motor-generator 4, and, for example, a lithium-ion battery, in which a cell module configured from numerous cells is set inside a battery pack case, is used therefor. A junction box which aggregates a relay circuit for carrying out supply/cutoff/distribution of heavy current is built into this high-capacity battery 21, and further attached thereto are a cooling fan unit 24 having a battery cooling function and a lithium battery controller 86 which monitors the battery state of charge (battery SOC) and the battery temperature.

The high-capacity battery 21 and the motor-generator 4 are connected to the DC harness 25 and the inverter 26 via the AC harness 27. A motor controller 83 for performing powering/regeneration control is attached to the inverter 26. That is, the inverter 26 converts the direct current from the DC harness 25 into three-phase alternating current to the AC harness 27 during powering when the motor-generator 4 is driven by the discharge of the high-capacity battery 21. In addition, the inverter converts the three-phase alternating current from the AC harness 27 into direct current to the DC harness 25 during regeneration for charging the high-capacity battery 21 with the power generation by the motor-generator 4.

The 12V battery 22 is a secondary battery mounted as the power source of a 12V system load, including the starter motor and auxiliary machines; for example, a lead battery mounted on an engine vehicle or the like is used. The high-capacity battery 21 and the 12V battery 22 are connected via a DC branch harness 25a, a DC/DC converter 37, and a battery harness 38. The DC/DC converter 37 converts several hundred volts from the high-capacity battery 21 to 12V, which is configured to manage the charging amount of the 12V battery 22 by controlling the DC/DC converter 37 with the hybrid control module 81.

The electronic control system of an FF hybrid vehicle comprises a hybrid control module 81 (abbreviated as: "HCM") as an electronic control unit that has an integrated control function to appropriately manage the energy consumption of the entire vehicle, as illustrated in FIG. 1. An engine control module 82 (abbreviated as: "ECM"), a motor controller 83 (abbreviated as: "MC"), and a CVT control unit 84 (abbreviated as "CVTCU"), are provided as other electronic control units. Furthermore, a brake control unit 85 (abbreviated as: "BCU") and a lithium battery controller 86 (abbreviated as: "LBC") are provided. These electronic control units 81, 82, 83, 84, 85, 86 are connected so as to be capable of exchanging bidirectional information via a CAN communication line 90 (CAN for "Controller Area Network"), and share information with each other.

The hybrid control module 81 carries out various integrated controls based on input information from the other electronic control units 82, 83, 84, 85, and 86, and the ignition switch 91 and the like.

The engine control module 82 obtains input information from the hybrid control module 81, the engine rotation speed sensor 92, and the like. The engine control module carries out a start control, a fuel injection control, an ignition control, a fuel cut-off control, an engine idle rotation control, etc., of the transverse engine 2, based this input information.

The motor controller 83 obtains input information from the hybrid control module 81, the motor rotational speed sensor 93, and the like. The motor controller carries out motor idle control, motor creep control, regeneration control, and powering control of the motor-generator 4, according to control commands to the inverter 26, based on this input information.

The CVT control unit 84 obtains input information from the hybrid control module 81, the accelerator position opening amount sensor 94, the vehicle speed sensor 95, an inhibitor switch 96, an ATF oil temperature sensor 97, and the like. The CVT control unit carries out the engagement hydraulic pressure control of the first clutch 3, the engagement hydraulic pressure control of the second clutch 5, the shifting hydraulic pressure control of the belt-type continuously variable transmission 6 by the primary pressure and the secondary pressure, and the like by outputting control commands to the control valve unit 6d based on this input information.

The brake control unit 85 obtains input information from the hybrid control module 81, the brake switch 98, the brake stroke sensor 99, and the like. The brake control unit outputs control commands to the brake fluid pressure control unit 17 based this input information. The brake control unit 85 carries out TCS control, VDC control, automatic brake control, cooperative regenerative control, ABS control, and the like.

The lithium battery controller 86 manages the battery SOC, the battery temperature, and the like for the high-capacity battery 21 based on input information from the battery voltage sensor 100, the battery temperature sensor 101, and the like.

Configuration of the Regenerative Speed Control Process

Figure 2:
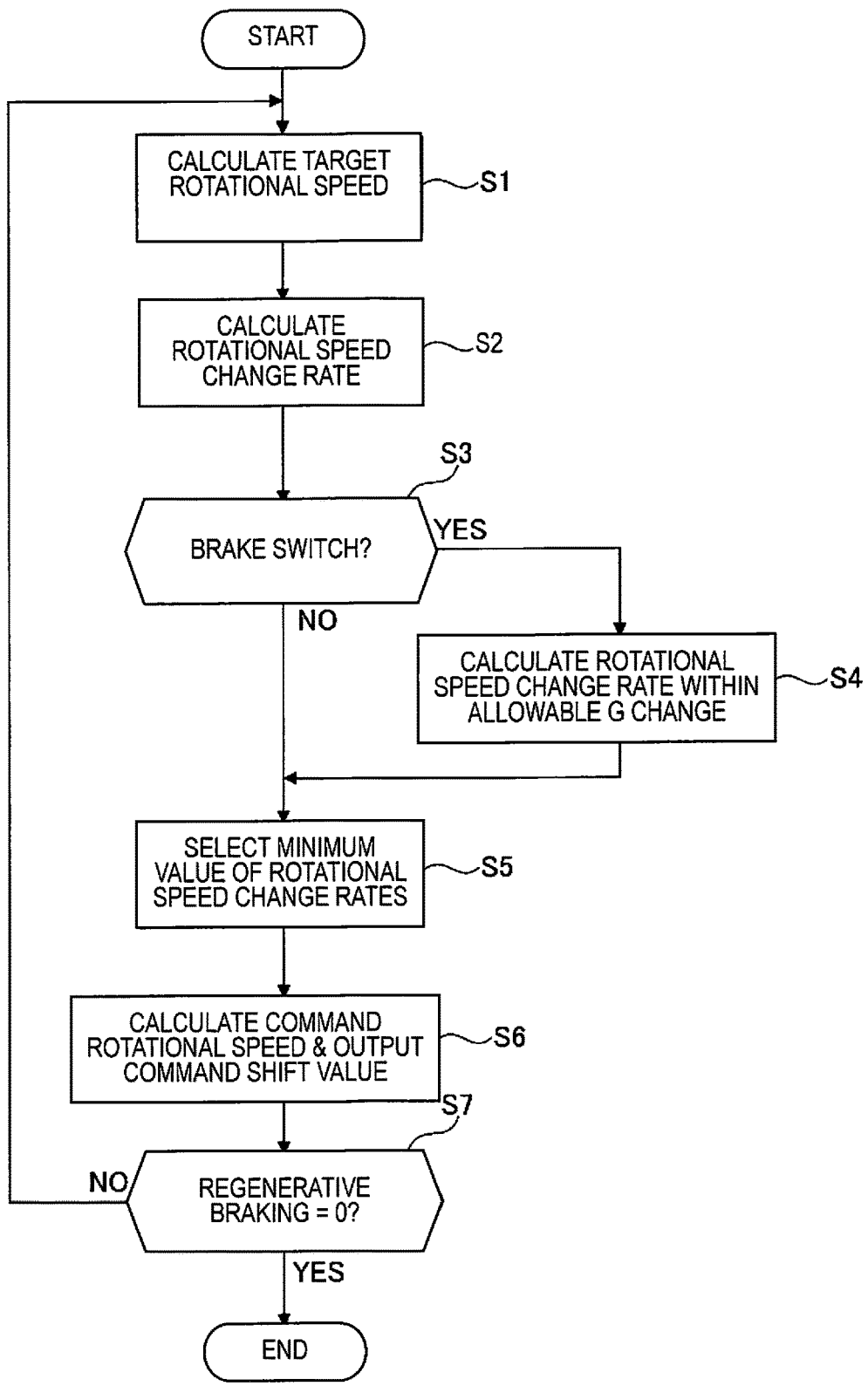
FIG. 2 is a flowchart illustrating the steps of the regenerative speed control process that is executed in the hybrid control module of the first embodiment.

FIG. 2 is a flowchart illustrating the steps of the regenerative speed control process that is executed in the hybrid control module 81 (controller) of the first embodiment. Each step of FIG. 2 showing the configuration of the regenerative speed control process, in which the process is started based on a cooperative regenerative control start request, and in which the process is ended when regenerative braking becomes zero due to brake switching, will be described below.

Figure 3:
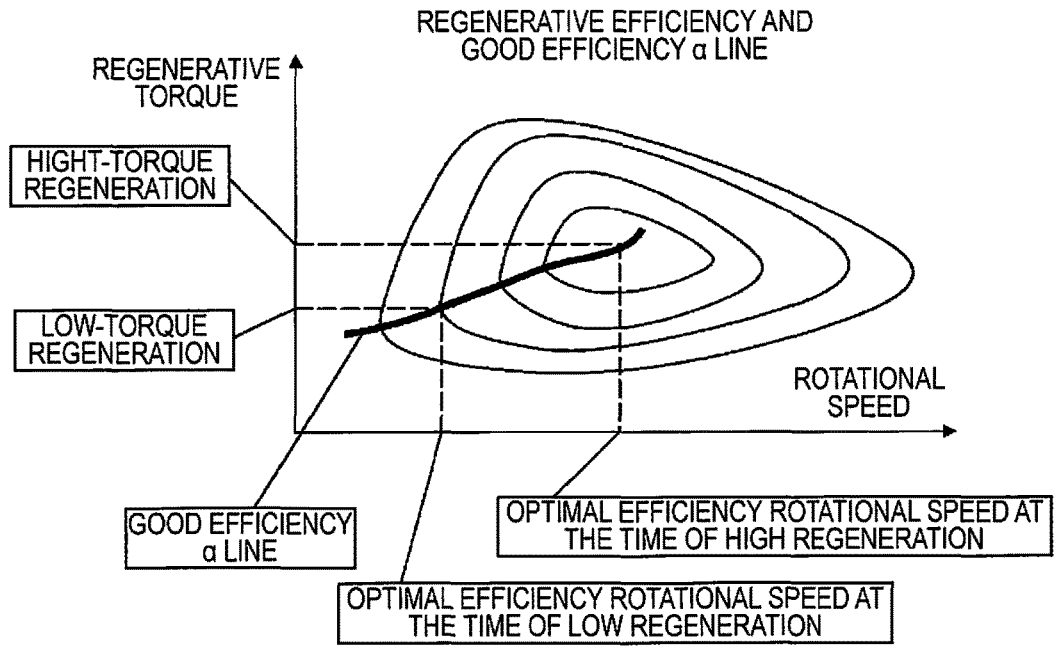
FIG. 3 is a characteristic diagram illustrating the regenerative efficiency and optimal efficiency a line, which becomes the basis for determining the relationship between the rotational speed and the regenerative torque during regeneration, in the regenerative speed control process of the first embodiment.
Figure 4:
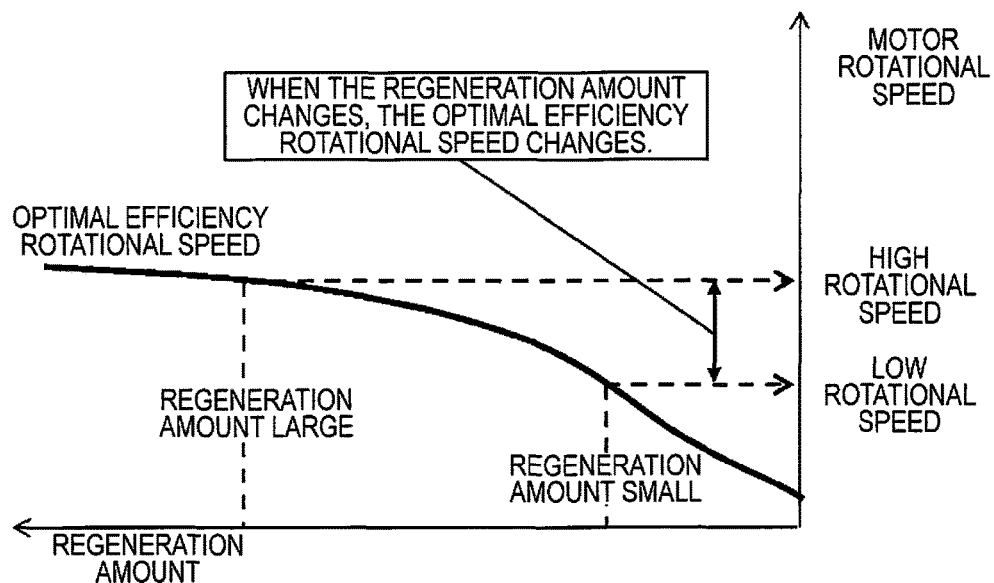
FIG. 4 is a relational characteristic diagram illustrating the relationship between the motor rotational speed and the regeneration amount by the optimal efficiency rotation that is used for calculating the target rotational speed in the regenerative speed control process of the first embodiment.

In Step S1, following the start of the process based on a cooperative regenerative control start request, or, the determination in Step S7 that regenerative braking >0, a target rotational speed according to optimal regenerative efficiency with respect to the regenerative torque is calculated, and the steps proceed to Step S2. For example, the relationship between the regenerative torque and the rotational speed becomes the optimal regenerative efficiency when on the optimal efficiency a line, as illustrated in FIG. 3. This relationship, redrawn as the relationship between the regeneration amount and the motor rotational speed, is the characteristic illustrated in FIG. 4; when the regeneration amount (=regenerative torque×rotational speed) is determined, the motor rotational speed (=target rotational speed) that achieves the optimal regenerative efficiency is also determined. If the regeneration amount changes, the optimal regenerative efficiency rotational speed will also change; when the regeneration amount changes from small to large, the optimal regenerative efficiency can be obtained when the motor rotational speed (=target rotational speed) is set to a high rotational speed; and when the regeneration amount changes from large to small, the optimal regenerative efficiency can be obtained when the motor rotational speed (=target rotational speed) is set to a low rotational speed. Therefore, in the first embodiment, while the brake operating amount is small and the regeneration amount is small, for example, the target rotational speed in the regenerative speed control is set to a rotational speed that is slightly higher than the lower-limit rotational speed. Additionally, if there is an additional brake pedal depression operation in the brake switching region and the regeneration amount is increased, then the target rotational speed is increased at once from the rotational speed before the additional depression; thereafter, if the regenerative torque decreases accompanying a brake switch, then the target rotational speed is gradually decreased toward the lower-limit rotational speed. The "lower-limit rotational speed" shall be the rotational speed, which is determined as the pump rotational speed of the main oil pump 14 for obtaining an oil amount for producing the necessary hydraulic pressure to the belt-type continuously variable transmission 6 during deceleration. Here, the "necessary hydraulic pressure" is the hydraulic pressure with which it is possible to shift during deceleration (low return shift) with a suitable CVT clamping force.

In Step S2, following the calculation of the target rotational speed in Step S1, a Pri end command rotational speed change rate, which ensures the responsiveness to the target rotational speed, is calculated, and the steps proceed to Step S3. Then, when increasing the target rotational speed from the lower-limit rotational speed at once, the Pri end rotational speed increase change rate is given as the increase change rate when the downshift speed of the belt-type continuously variable transmission 6 by the hydraulic pressure at that time is the maximum transmission speed. When gradually decreasing from the target rotational speed to the lower-limit rotational speed, the Pri end command rotational speed decrease change rate is given as the Pri end command rotational speed change rate of the transmission speed that follows the target rotational speed by upshifting the belt-type continuously variable transmission 6.

In Step S3, following the calculation of the rotational speed change rate in Step S2, it is determined whether or not it is in a brake switching region, in which the braking force that achieves the requested braking force is switched from regenerative braking to hydraulic braking due to a decrease in vehicle speed. If YES (brake switching region), then the steps proceed to Step S4; and if NO (regenerative braking region), then the steps proceed to Step S5. Here, the brake switching region is determined when the vehicle speed becomes less than or equal to a brake switching start vehicle speed due to a low vehicle speed and a brake switching command is issued. In addition, in the brake switching region, the regenerative braking is gradually decreased from the brake switching start vehicle speed to a brake switching end vehicle speed, and a cooperative control is carried out, in which the decrease amount of the regenerative braking is compensated by the increase amount of the hydraulic braking.

Figure 5:
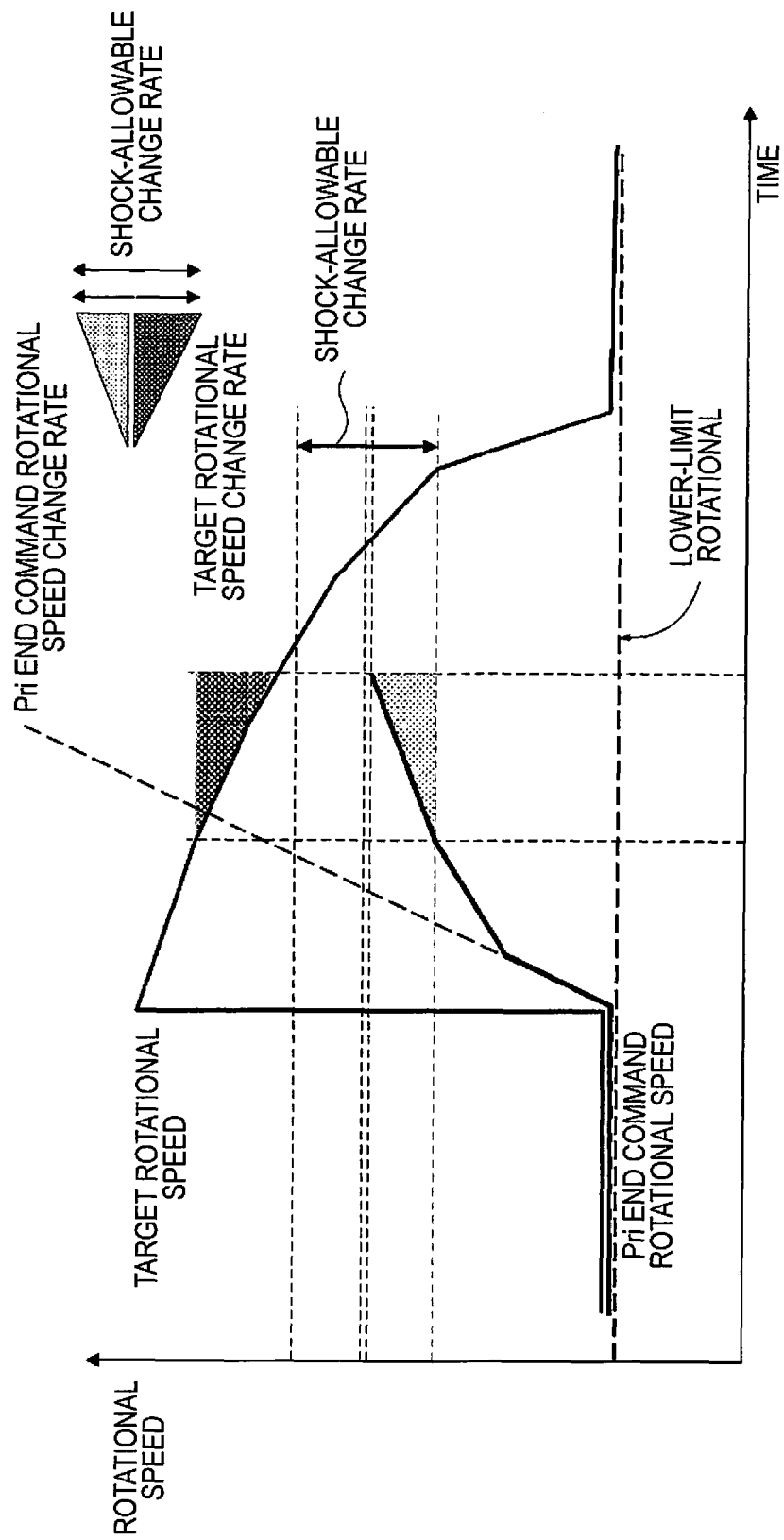
FIG. 5 is a characteristic diagram illustrating the conceptual basis for calculating a Pri end command rotational speed change rate that falls within a shock-allowable change rate, in a brake switching region in the regenerative speed control process according to the first embodiment.

In Step S4, following the determination of a brake switching region in Step S3, a Pri end command rotational speed change rate that will be within an allowable G change is calculated, and the steps proceed to Step S5. Here, for the "Pri end command rotational speed change rate," a rotational speed change rate value that ensures responsiveness is calculated in the same manner as in Step S2, from when the brake switching region is started until an additional brake pedal depression operation is carried out. On the other hand, when an additional brake pedal depression operation is carried out, the rotational speed change rate value is calculated according to the idea that inertia shock can be suppressed if the rotational speed change rate, obtained by adding the Pri end command rotational speed change rate and the target rotational speed change rate, is less than or equal to the shock-allowable change rate, as illustrated in FIG. 5. Therefore, when carrying out a regenerative speed control based on an additional brake pedal depression operation in the brake switching region, the Pri end command rotational speed change rate is set to be a calculated value that is less than or equal to the change rate obtained by subtracting the target rotational speed change rate with the target rotational speed characteristic based on the decrease of the regenerative torque from the shock-allowable change rate, as shown in the following formula (1).

$$(\text{Pri end command rotational speed change rate}) \leq (\text{Shock-allowable change rate}) - (\text{Target rotational speed change rate}) \quad (1)$$

The "shock-allowable change rate" is given as a limit value whereby a vehicle deceleration G fluctuation accompanying a change in the rotational speed due to the rise and fall of the Pri end actual rotational speed will be within an allowable G fluctuation that does not impart discomfort to the driver. The "Pri end command rotational speed change rate" may also be determined with consideration to the response delay of the hydraulic pressure response and the mechanical response, or the like.

In Step S5, following the determination of the regenerative braking region in Step S4, or, the calculation of the Pri end command rotational speed change rate in Step S4, the minimum value of the Pri end command rotational speed change rate calculated in Step S2 and the Pri end command rotational speed change rate calculated in Step S4 is selected, and the steps proceed to Step S6. That is, when the regenerative braking region is determined, since the Pri end command rotational speed change rate is not calculated in Step S4, the Pri end command rotational speed change rate calculated in Step S2 is selected. On the other hand, if the Pri end command rotational speed change rate is calculated in Step S4 based on the determination that it is in the brake switching region, then, of the two Pri end command rotational speed change rates, the one with the smaller calculated value will be selected.

In Step S6, following the selection of the minimum value of the Pri end command rotational speed change rate in Step S5, the current Pri end command rotational speed is calculated from the previous Pri end command rotational speed and the Pri end command rotational speed change rate selected in Step S5. Then, the command shift value to obtain the current Pri end command rotational speed is output from the CVT control unit 84, and the steps proceed to Step S7.

In Step S7, following the calculation of the Pri end command rotational speed and the output of the command shift value in Step S6, it is determined whether or not regenerative braking has become zero. If YES (regenerative braking=0), then the steps proceed to End, and if NO (regenerative braking≠0), then steps return to Step S1.

Next, the actions are described. The "action of the regenerative speed control process," "action of the regenerative speed control," and the "feature action of the regenerative speed control" will be separately described, regarding the actions of the regenerative speed control device for FF hybrid vehicles according to the first embodiment.

Action of the Regenerative Speed Control Process

The action of the regenerative speed control process will be described below, based on the flowchart of FIG. 2.

While the regenerative braking region is being maintained, after the start of the process based on a cooperative regenerative control start request, the steps that progress from Step S1→Step S2→Step S3→Step S5→Step S6→Step S7 in the flowchart of FIG. 2 are repeated. In Step S1, the target rotational speed according to optimal efficiency with respect to the regenerative torque is calculated. In Step S2, a Pri end command rotational speed change rate that ensures the responsiveness to the target rotational speed is calculated. In Step S5, the Pri end command rotational speed change rate calculated in Step S2 is selected. In Step S6, the current Pri end command rotational speed is calculated from the previous Pri end command rotational speed and the Pri end command rotational speed change rate selected in Step S5. Then, the command shift value to obtain the current Pri end command rotational speed is output from the CVT control unit 84. Therefore, while the regenerative braking region is being maintained, if the target rotational speed is set to a rotational speed that slightly exceeds the lower-limit rotational speed, regenerative speed control is carried out such that the Pri end rotational speed of the belt-type continuously variable transmission 6 maintains the target rotational speed, regardless of a decrease in the vehicle speed. If the target rotational speed is raised due to a brake depression operation or an additional brake pedal depression operation while the regenerative braking region is being maintained, then regenerative speed control by downshifting is carried out such that the target rotational speed is reached at a Pri end command rotational speed change rate that ensures responsiveness.

On the other hand, when the brake switching region is entered from regenerative braking to hydraulic braking due to a decrease in the vehicle speed, the steps that progress from Step S1→Step S2→Step S3→Step S4→Step S5→Step S6→Step S7 in the flowchart of FIG. 2 are repeated. In Step S4, when an additional brake pedal depression operation is carried out in the brake switching region, a Pri end command rotational speed change rate that will be within the allowable G change is calculated. In Step S5, the smaller of the Pri end command rotational speed change rate calculated in Step S2 and the Pri end command rotational speed change rate calculated in Step S4 is selected. In Step S6, the current Pri end command rotational speed is calculated from the previous Pri end command rotational speed and the Pri end command rotational speed change rate selected in Step S5. Then, the command shift value to obtain the current Pri end command rotational speed is output from the CVT control unit 84. Therefore, in the brake switching region from regenerative braking to hydraulic braking, for example, if an additional brake pedal depression operation is carried out, then the Pri end command rotational speed change rate is limited to a value that is less than or equal to the change rate obtained by subtracting the target rotational speed change rate with the target rotational speed characteristic from the shock-allowable change rate. Regenerative speed control is thereby carried out with respect to a target rotational speed characteristic, which gradually decreases toward the lower-limit rotational speed after increasing from the lower-limit rotational speed, while maintaining the limited Pri end command rotational speed change rate.

Action of the Regenerative Speed Control

The "action of the regenerative speed control in a comparative example (FIG. 6)" and the "action of the regenerative speed control in the first embodiment (FIG. 7)" will be described separately, with respect to the action of the regenerative speed control.

Figure 6:
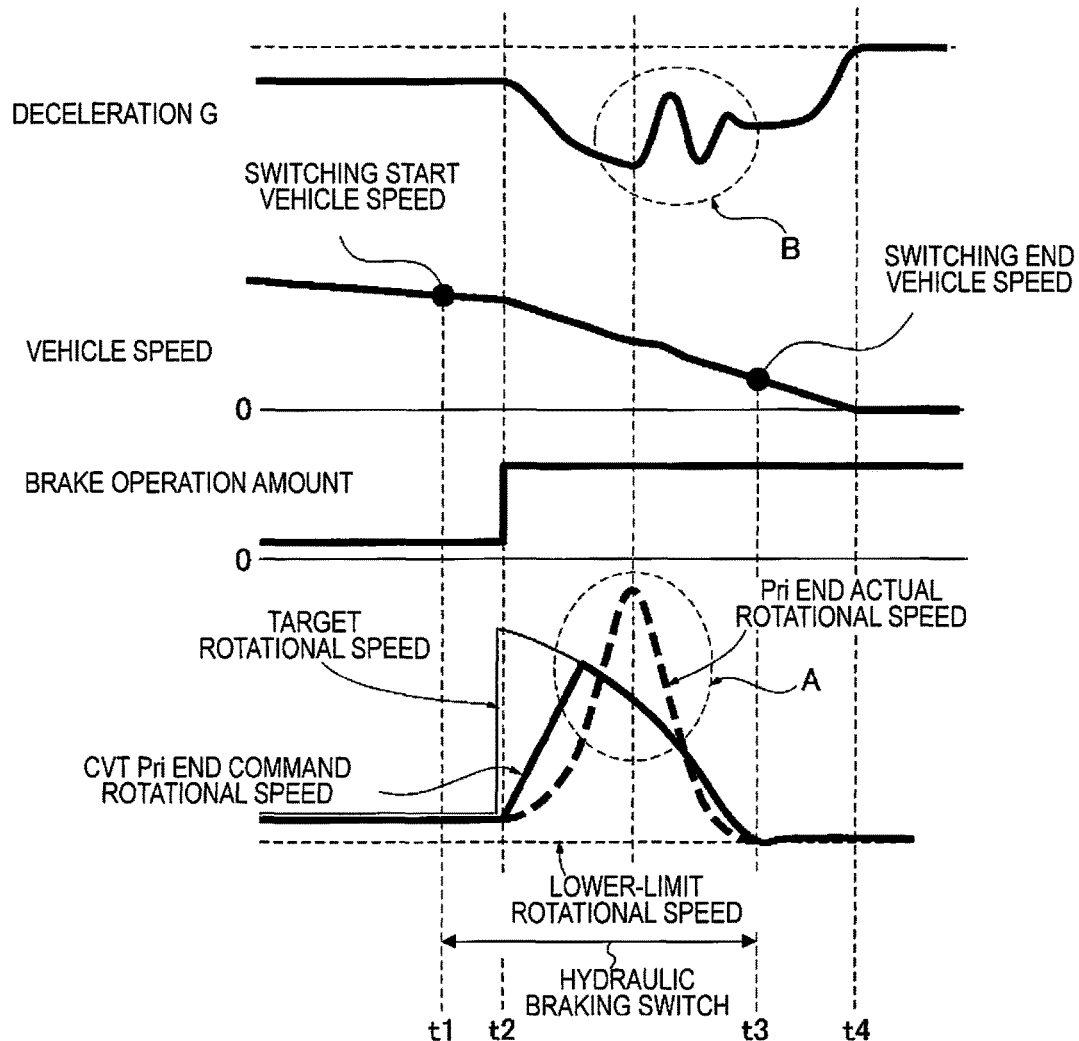
FIG. 6 is a timing chart illustrating the characteristic of each of the deceleration G, vehicle speed, brake operating amount, Pri end command rotational speed, Pri end actual rotational speed, target rotational speed, and the lower-limit rotational speed, when carrying out a regenerative speed control based on an additional brake pedal depression operation in a brake switching region due to a decrease in the vehicle speed, in a regenerative speed control process of a comparative example.

Action of the Regenerative Speed Control in a Comparative Example: FIG. 6

In a comparative example, regardless of whether or not it is in the brake switching region, if an additional brake pedal depression operation is carried out, regenerative speed control is carried out by downshifting so as to reach the target rotational speed with a steep slope by a Pri end command rotational speed change rate that ensures responsiveness. Then, once the target rotational speed is reached, upshifting is carried out so as to decrease to the lower-limit rotational speed at a Pri end command rotational speed change rate that follows a decrease characteristic of the target rotational speed. In FIG. 6, time t1 is the brake switching start time. Time t2 is the downshift start time by an additional brake pedal depression operation. Time t3 is the brake switching end time. Time t4 is the vehicle stop time.

In the case of the comparative example, if brake switching is started at time t1 and the driver carries out an additional brake pedal depression operation with the intent to stop the vehicle at time t2, downshifting is started accompanying the change in the target rotational speed. When downshifting is started at time t2, downshifting is carried out by a Pri end command rotational speed change rate, which rapidly increases the Pri end command rotational speed toward the target rotational speed, as illustrated by the solid line characteristic in FIG. 6. Then, when the target rotational speed is reached immediately after time t2, upshifting is carried out, whereby the Pri end command rotational speed is rapidly decreased along an arc-shaped target rotational speed characteristic to reach the lower-limit rotational speed. In addition, if the regenerative speed control is set to a feedback transmission control (for example, PI control), the follow-up response of the Pri end actual rotational speed with respect to the Pri end command rotational speed is delayed.

Consequently, examination of the Pri end actual rotational speed characteristic shows that the Pri end actual rotational speed is rapidly increased after a delay from the additional brake pedal depression time t2, as illustrated by the broken line characteristic in FIG. 6. Then, after rapidly increasing, the Pri end actual rotational speed is turned back and rapidly decreased, causing an overshoot in which the Pri end actual rotational speed exceeds the target rotational speed (characteristic in the frame indicated by arrow A in FIG. 6).

With this rapid change in the Pri end actual rotational speed, inertia shock due to deceleration G occurs in the vicinity of the turnaround of the rise and fall of the Pri end actual rotational speed (characteristic in the frame indicated by arrow B in FIG. 6), imparting discomfort to the driver that is maintaining a constant brake operation after the additional brake pedal depression operation.

Figure 7:
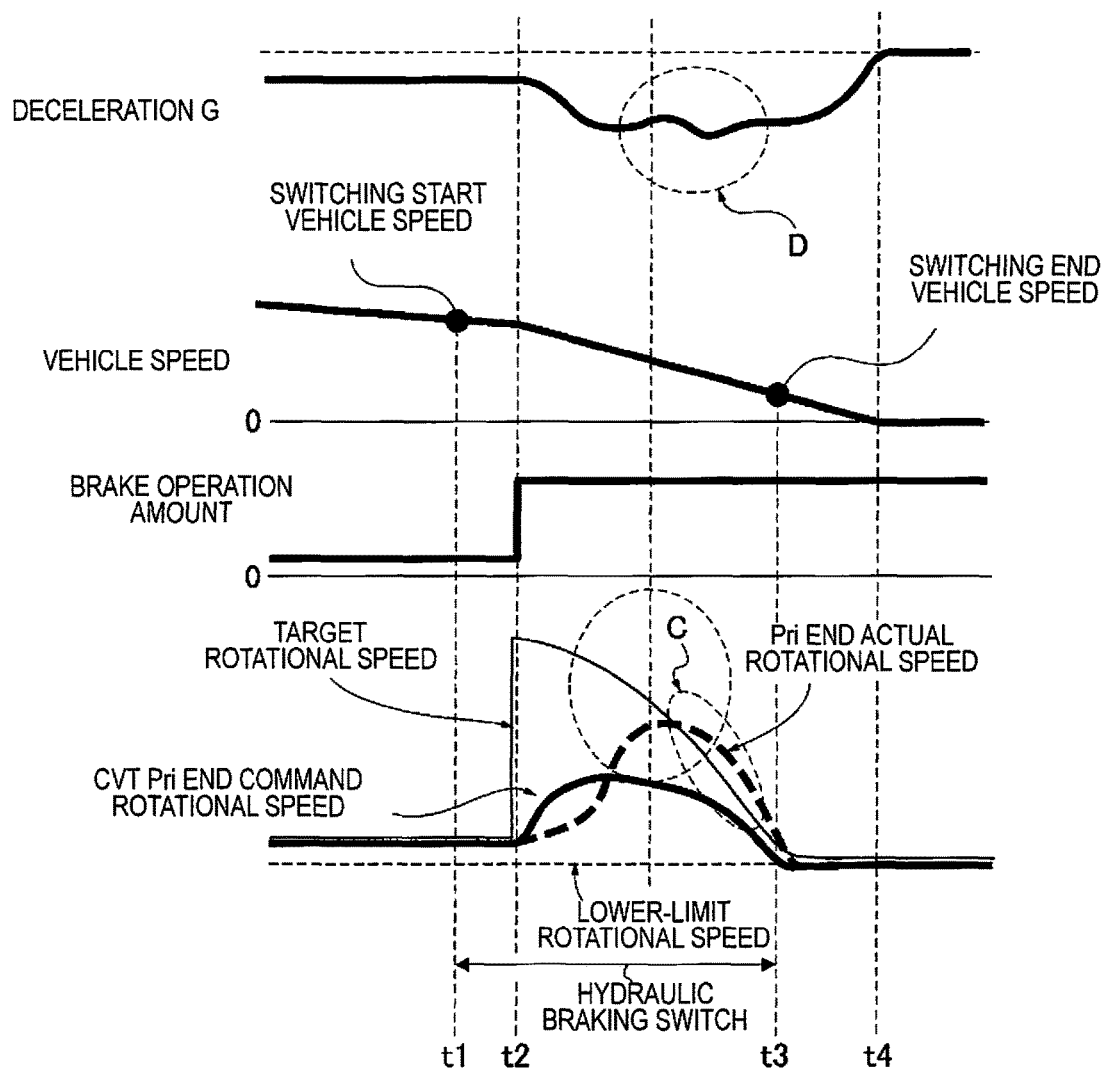
FIG. 7 is a timing chart illustrating the characteristic of each of the deceleration G, vehicle speed, brake operating amount, Pri end command rotational speed, Pri end actual rotational speed, target rotational speed, and the lower-limit rotational speed, when carrying out a regenerative speed control based on an additional brake pedal depression operation in a brake switching region due to a decrease in the vehicle speed, in the regenerative speed control process of the first embodiment.

Action of the Regenerative Speed Control in the First Embodiment: FIG. 7

In contrast to the comparative example described above, in the first embodiment, if an additional brake pedal depression operation is carried out in the brake switching region, a regenerative speed control is carried out in which the Pri end command rotational speed change rate is limited to a value that is less than or equal to the change rate obtained by subtracting the target rotational speed change rate from the shock-allowable change rate. In FIG. 7, time t1 is the brake switching start time. Time t2 is the downshift start time of an additional brake pedal depression operation. Time t3 is the brake switching end time. Time t4 is the vehicle stop time.

In the case of the first embodiment, if brake switching is started at time t1 and the driver carries out an additional brake pedal depression operation with the intent to stop the vehicle at time t2, downshifting is started accompanying a change in the target rotational speed. When downshifting is started at time t2, the Pri end command rotational speed is raised toward the target rotational speed immediately after starting, after which the Pri end command rotational speed is changed so as to maintain the opening angle formed with the target rotational speed characteristic, as illustrated by the solid line characteristic in FIG. 7. Thus, a regeneration shifting is carried out such that the Pri end command rotational speed draws a gentle arc-shaped curve and reaches the lower-limit rotational speed at time t3. Therefore, while the follow-up response of the Pri end actual rotational speed with respect to the Pri end command rotational speed is delayed due to the feedback transmission control, examination of the Pri end actual rotational speed characteristic shows that overshooting, in which the Pri end actual rotational speed follows an arc-shaped curve without a turnaround and the Pri end actual rotational speed exceeds the target rotational speed, as illustrated by the broken line characteristic in FIG. 7, is suppressed (characteristic in the frame indicated by arrow C in FIG. 7).

By moderating the change of this Pri end actual rotational speed, it is possible to suppress inertia shock caused by deceleration G in the vicinity of where the Pri end actual rotational speed shifts from an increase to a decrease (characteristic in the frame indicated by arrow D in FIG. 7). As a result, it is possible to prevent imparting discomfort to the driver that is maintaining a constant brake operation after an additional brake pedal depression operation.

Feature Action of the Regenerative Speed Control

The first embodiment is configured to impose a limitation on the Pri end command rotational speed change rate for the Pri end command rotational speed when carrying out a regenerative speed control based on an additional brake pedal depression operation in a brake switching region for switching from regenerative braking to mechanical braking due to a decrease in vehicle speed. That is, in a regenerative speed control based on an additional brake pedal depression operation, downshifting is carried out, in which the Pri end command rotational speed is increased toward the target rotational speed. However, since the Pri end command rotational speed reaches the target rotational speed, which has a characteristic of decreasing with time in a brake switching region, it is necessary to lower the transmission input rotational speed after reaching the target rotational speed. When carrying out a regenerative speed control based on an additional brake pedal depression operation in such a brake switching region, the Pri end command rotational speed change rate of the Pri end command rotational speed changes gently by imposing a limit on the Pri end command rotational speed change rate of the Pri end command rotational speed. Thus, even if there is a follow-up response delay due to a feedback transmission control, it is possible to suppress overshooting, in which the Pri end actual transmission rotational speed exceeds the target rotational speed, and the occurrence of inertia shock in the vicinity of where the Pri end actual rotational speed shifts from increase to decrease is also suppressed. As a result, it is possible to prevent discomfort from being imparted to a driver, who maintains a constant brake operation after additional depression, when performing a regenerative speed control based on an additional brake pedal depression operation in a brake switching region due to a decrease in vehicle speed while decelerating.

The first embodiment is configured to impose a limit on the Pri end command rotational speed change rate of the Pri end command rotational speed to be less than or equal to a shock-allowable change rate, which allows inertia shock due to vehicle deceleration G fluctuation accompanying a change in the rotational speed due to rise and fall. That is, if limited, the Pri end command rotational speed change rate becomes less than or equal to a shock-allowable change rate, which allows inertia shock due to vehicle deceleration G fluctuation. Therefore, it is possible to reliably prevent the imparting of discomfort to the driver, who is maintaining a constant brake operation after an additional brake pedal depression operation in the brake switching region.

The first embodiment is configured to limit the Pri end command rotational speed change rate, when carrying out a regenerative speed control in the brake switching region, to a value that is less than or equal to the change rate obtained by subtracting the target rotational speed change rate with the target rotational speed characteristic, set based on the regenerative efficiency, from the shock-allowable change rate. That is, the Pri end command rotational speed change rate for when regenerative speed control is carried out in a brake switching region can be calculated using a target rotational speed characteristic that is set based on the regenerative efficiency in the brake switching region. Therefore, the process to limit the Pri end command rotational speed change rate is facilitated while achieving a limit to be less than or equal to a shock-allowable change rate that allows inertia shock due to vehicle deceleration G fluctuation.

Next, the effects are described. The effects listed below can be obtained with the regenerative speed control device for FF hybrid vehicles according to the first embodiment.

(1) In a vehicle (FF hybrid vehicle) provided with a continuously variable transmission (belt-type continuously variable transmission 6), and an electric motor (motor-generator 4) that is connected to an input shaft side of the continuously variable transmission (belt-type continuously variable transmission 6) and that regenerates energy during deceleration, a controller (hybrid control module 81) is provided which, when there is a request for an increase in the regeneration amount while decelerating, performs a regenerative speed control for downshifting the continuously variable transmission (belt-type continuously variable transmission 6) to the low gear ratio side, and increasing rotational speed of a transmission input shaft to which the electric motor (motor-generator 4) is connected, and the controller (hybrid control module 81) imposes a limitation on a rotational speed change rate (Pri end command rotational speed change rate) of the transmission input rotational speed (Pri end command rotational speed) when performing a regenerative speed control for increasing the transmission input rotational speed based on a request for an increase in the regeneration amount in a brake switching region, in which regenerative braking is switched to mechanical braking (hydraulic braking), due to a decrease in the vehicle speed. It is therefore possible to prevent discomfort from being imparted to a driver who maintains a constant request operation after requesting an increase, when performing a regenerative speed control based on a request for an increase in the regeneration amount in a brake switching region from regenerative to mechanical (hydraulic) due to a decrease in vehicle speed while decelerating.

(2) An oil pump (main oil pump 14) is provided, which is connected to the input shaft side of the continuously variable transmission (belt-type continuously variable transmission 6), in which a rotational speed for producing a necessary hydraulic pressure to the continuously variable transmission (belt-type continuously variable transmission 6) during deceleration is set as the lower-limit rotational speed, and when a brake depression operation or an additional brake pedal depression operation is carried out in a brake switching region due to a decrease in the vehicle speed, the controller (hybrid control module 81) sets a target rotational speed characteristic of regenerative braking that decreases toward a lower-limit rotational speed after the rotational speed increases based on regenerative efficiency, and imposes a limitation on a transmission input rotational speed command value (Pri end command rotational speed) by a regenerative speed control for approaching the target rotational speed characteristic. Thus, in addition to the effects of (1), it is possible to prevent discomfort from being imparted to a driver who maintains a constant brake operation after depression or additional depression, when performing a regenerative speed control based on a brake depression operation or an additional brake pedal depression operation in a brake switching region due to a decrease in vehicle speed.

(3) The controller (hybrid control module 81) imposes a limit on the rotational speed change rate (Pri end command rotational speed change rate) of the transmission input rotational speed (Pri end command rotational speed) to be less than or equal to a shock-allowable change rate, which allows inertia shock due to vehicle deceleration G fluctuation accompanying a change in the rotational speed due to rise and fall. Thus, in addition to the effects of (2), it is possible to reliably prevent imparting discomfort to the driver that is maintaining a constant brake operation after a brake depression operation or an additional brake pedal depression operation in the brake switching region.

(4) The controller (hybrid control module 81) imposes a limit on the command rotational speed change rate (Pri end command rotational speed change rate), when carrying out a regenerative speed control in the brake switching region, to a value that is less than or equal to the change rate obtained by subtracting the target rotational speed change rate with the target rotational speed characteristic, set based on regenerative efficiency, from the shock-allowable change rate. Thus, in addition to the effects of (3), it is possible to facilitate the process to limit the command rotational speed change rate (Pri end command rotational speed change rate), while achieving a limit to be less than or equal to a shock-allowable change rate that allows inertia shock due to vehicle deceleration G fluctuation.

The vehicle regenerative speed control device of the present invention was described above based on the first embodiment, but specific configurations thereof are not limited to the first embodiment, and various modifications and additions to the design can be made without departing from the scope of the invention according to each claim in the Claims.

In the first embodiment, an example was shown in which the Pri end command rotational speed change rate is limited, when carrying out a regenerative speed control in the brake switching region, to a value that is less than or equal to the change rate obtained by subtracting the target rotational speed change rate with the target rotational speed characteristic, based on a decrease in the regenerative torque, from the shock-allowable change rate. However, the method of limiting the Pri end command rotational speed change rate when carrying out a regenerative speed control in the brake switching region is not limited to this method, and may be carried out by a filtering process, or the like, that suppresses the Pri end command rotational speed change rate.

In the first embodiment, an example was given in which a regenerative speed control is carried out based on an additional brake pedal depression operation in a brake switching region due to a decrease in vehicle speed. However, the invention is of course also applicable when carrying out a regenerative speed control based on a brake depression operation in the brake switching region due to a decrease in the vehicle speed.

In the first embodiment, an example was given in which a belt-type continuously variable transmission 6, in which a belt 6c is wound around a primary pulley 6a and a secondary pulley 6b, and the primary pulley pressure Ppri and the secondary pulley pressure Psec are the shifting hydraulic pressure, is used as the continuously variable transmission. However, the continuously variable transmission may be an example that uses a toroidal-type continuously variable transmission as well.

In the first embodiment, an example was shown in which the regenerative speed control device of the present invention is applied to an FF hybrid vehicle according to a one-motor and two-clutch drive system. However, the regenerative speed control device of the present invention can be applied to an FR hybrid vehicle, or a hybrid vehicle other than a one-motor two-clutch drive type, such as a direct coupling system of an engine and a motor, or a power split mechanism. Furthermore, the present invention can also be applied to an engine-equipped vehicle or an electric vehicle (including fuel cell vehicles), as long as the vehicle is equipped with an electric motor and a continuously variable transmission, and carries out cooperative regenerative control.

The invention claimed is:

1. A vehicle regenerative speed control device for a vehicle having
    a continuously variable transmission including a transmission input shaft,
    a mechanical brake system, and
    an electric motor that is connected to the transmission input shaft and that regenerates energy during deceleration,
    the vehicle regenerative speed control device comprising:
    a controller configured to execute a cooperative regenerative control with respect to a requested braking force, the cooperative braking control providing the requested braking force as a sum of a regenerative braking force generated by the electric motor and a mechanical braking force generated by the mechanical brake system,
    the controller being configured such that when the requested braking force increases during the cooperative regenerative control, the controller performs a regenerative speed control to downshift the continuously variable transmission to a lower gear and increase a rotational speed of the transmission input shaft, and during the cooperative braking control, the controller being configured to determine whether the vehicle is in a regenerative braking region in which the vehicle speed is larger than a brake switching start vehicle speed or a brake switching region in which the vehicle speed is smaller than or equal to a brake switching start vehicle speed and larger than or equal to a brake switching end vehicle speed that is smaller than the brake switching start vehicle speed,
    the controller being configured to execute the regenerative speed control such that a rotational speed change rate of the transmission input shaft is smaller when carrying out the regenerative speed control in the brake switching region than when carrying out the regenerative speed control in the regenerative braking region.

2. The vehicle regenerative speed control device according to claim 1, wherein
    an oil pump is provided, which is connected to the transmission input shaft,
    the controller sets a rotational speed of the transmission input shaft at which the oil pump produces a necessary hydraulic pressure to the continuously variable transmission during deceleration as a lower-limit rotational speed,
    the controller sets a target rotational speed characteristic of the regenerative braking in which a target rotational speed of the transmission input shaft determined based on regenerative efficiency first rises and then decreases toward the lower-limit rotational speed with time, and
    the controller accomplishes making the rotational speed change rate of the transmission input rotational speed smaller in the brake switching region by imposing a limitation on a transmission input rotational speed command value used by the regenerative speed control to make the rotational speed of transmission input shaft follow the target rotational speed characteristic when a brake depression operation or an additional brake pedal depression operation is carried out in the brake switching region.

3. The vehicle regenerative speed control device according to claim 2, wherein
    the controller limits the transmission input rotational speed command value such that the rotational speed change rate of the transmission input shaft is less than or equal to a shock-allowable change rate, the shock-allowable change rate being a rotational speed change rate at which an inertia shock due to fluctuation of a vehicle deceleration G accompanying a change in the rotational speed of the transmission input shaft is.

4. The vehicle regenerative speed control device according to claim 3, wherein
    when carrying out the regenerative speed control in the brake switching region, the controller imposes limits a command rotational speed change rate to a value that is less than or equal to a change rate obtained by subtracting a target rotational speed change rate of the target rotational speed characteristic from the shock-allowable change rate.

* * * * *